United States Patent [19]

Goloff

[11] Patent Number: 5,526,891
[45] Date of Patent: Jun. 18, 1996

[54] STEERING CONTROL ARRANGEMENT

[75] Inventor: C. Nickolas Goloff, Secor, Ill.

[73] Assignee: Caterpillar Inc., Peoria, Ill.

[21] Appl. No.: 414,262

[22] Filed: Mar. 31, 1995

[51] Int. Cl.⁶ ..................................................... B62D 5/08
[52] U.S. Cl. ............................................ 180/415; 180/417
[58] Field of Search ...................................... 180/132, 140, 180/DIG. 4, DIG. 6, DIG. 9, DIG. 17

[56] References Cited

U.S. PATENT DOCUMENTS

| | | | |
|---|---|---|---|
| 4,043,422 | 8/1977 | Barrett et al. | 180/140 |
| 4,175,638 | 11/1979 | Christensen | 180/140 |
| 4,638,883 | 1/1987 | Momizumi et al. | 180/140 X |
| 4,645,025 | 2/1987 | Ohe et al. | 180/140 X |
| 4,768,602 | 9/1988 | Inoue et al. | 180/140 |
| 4,917,204 | 4/1990 | Andrew et al. | 180/140 |
| 5,111,901 | 5/1992 | Bachhuber et al. | 180/140 |

Primary Examiner—Margaret A. Focarino
Assistant Examiner—F. Zeender
Attorney, Agent, or Firm—J. W. Burrows

[57] ABSTRACT

Many known all wheel steer arrangements suffer from the problem that the front and rear wheels getting out of synchronization due to leakage and/or inadvertent passing of fluid across the control valve arrangement therein. In the subject invention, a hydraulic system has front and rear pairs of steerable wheels respectively interconnected by first and second fluid cylinder arrangements. A steering control arrangement operatively controls the front and rear pairs of steerable wheels between a mode in which only the front pair of wheels are steered, a second mode in which both the front and rear pairs of wheels are simultaneously steered but in opposite directions, and a third mode in which the rear wheels are steered independently of the front pair of wheels. First, second and third poppet valve arrangements 50, 70, 82 are utilized to provide control for the various modes of operation and to provide separation of the fluid between the first and second cylinder arrangements used to steer the respective front and rear wheel assemblies. Back to back poppet valves are used in each of the first, second and third poppet valve arrangements to insure that when the respective poppet valve arrangements are in their closed flow blocking position, that no fluid flow is allowed to pass thereacross.

9 Claims, 1 Drawing Sheet

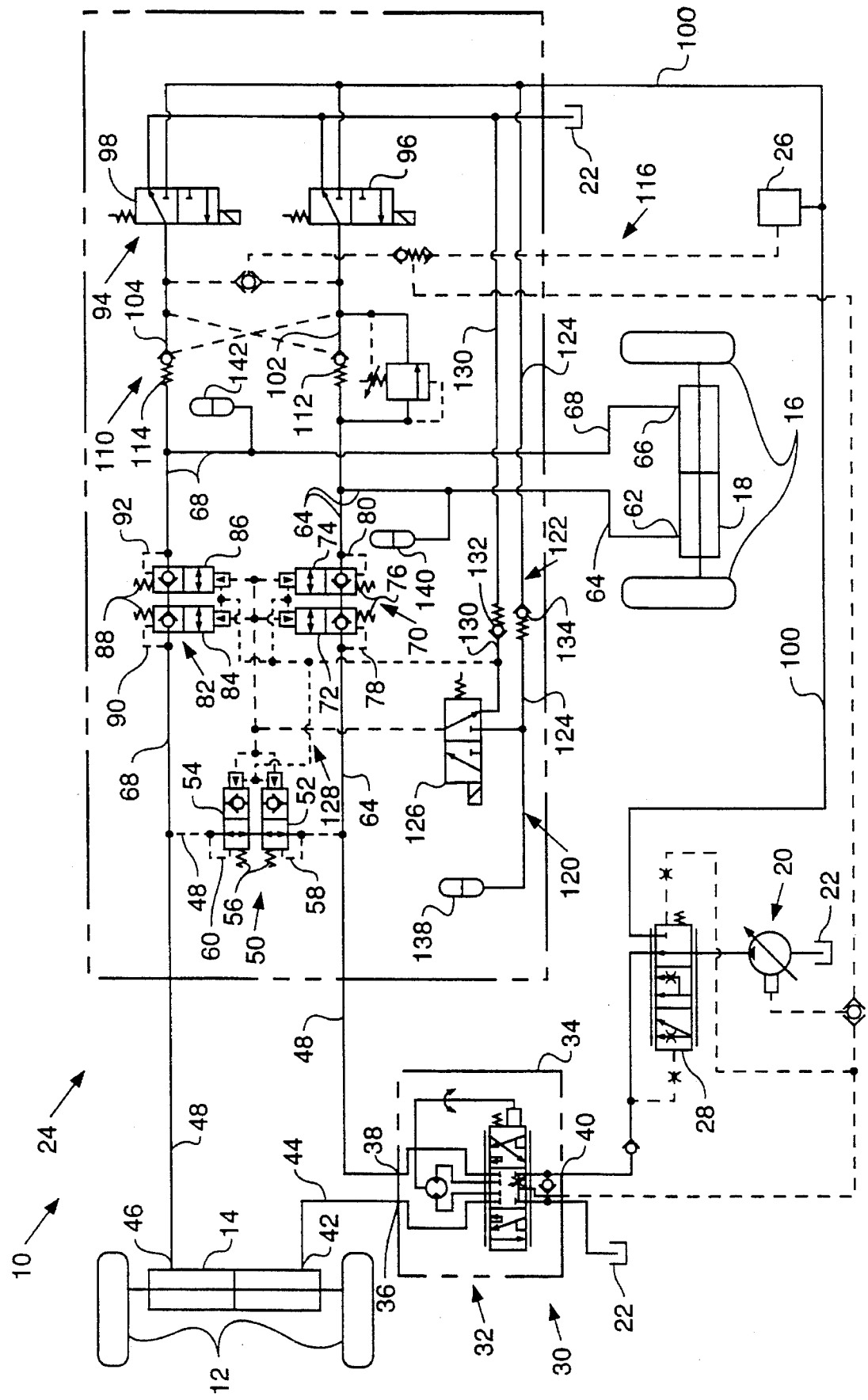

5,526,891

STEERING CONTROL ARRANGEMENT

TECHNICAL FIELD

This invention relates generally to the steering of an all wheel steer machine and, more particularly, to a steering control system utilizing back to back poppets for the control of the all wheel steer machine.

BACKGROUND ART

Many systems for controlling the steering of machines have included mechanical systems of which hydraulic pumps and various hydraulic valves and other components are used to control the steering of the vehicle. Likewise, electrically controlled four wheel steering systems have been used in which an electronic controller selects the steering mode and provides for independent control of the various steered wheels on the machine. In previous systems, spool type valves have been used but are subjected to various degrees of leakage between the spool and the bore in which the spool is slidably disposed. Likewise, in at least one instance, poppet valves have been used in an attempt to overcome the problems associated with spool type valves. However, in these systems, due to system operating parameters, it is difficult to keep the poppet valves positively seated during all operating conditions. If the poppet valves are not kept seated during operation, synchronization of the front and rear steered wheels is not maintained resulting in the steerable wheels drifting in directions other than that desired by the operator.

The present invention is directed to overcoming one or more of the problems as set forth above.

DISCLOSURE OF THE INVENTION

In one aspect of the present invention, a steering control arrangement is provided for use in a machine having a first cylinder arrangement connected between a front pair of steerable wheels and a second cylinder arrangement connective between a rear pair of steerable wheels, a reservoir, and a source of pressurized fluid. A steering control arrangement is provided and includes a steering valve directly connected to one end of the first cylinder arrangement. The machine has a first steering mode for steering only the front pair of steerable wheels, a second steering mode for simultaneously steering the front and rear pairs of steerable wheels, and a third steering mode for steering the rear pair of steerable wheels independent of the front pair of steerable wheels. A first valve mechanism is fluidly connected between the source of pressurized fluid and the opposite ends of the second steering arrangement. The machine includes a first poppet valve arrangement fluidly connected between the steering valve and the other end of the first cylinder arrangement, a second poppet valve arrangement fluidly connected between the steering valve and the connection between the first valve mechanism and the one end of the second cylinder arrangement, and a third poppet valve arrangement fluidly connective between the other end of the first cylinder arrangement and the connection between the first valve mechanism and the other end of the second cylinder arrangement. The machine includes a pilot control arrangement having a source of pressurized fluid and operative to selectively control opening and closing of the first, second and third poppet valve arrangements. The first poppet valve arrangement has a first normally open poppet valve and a second normally open poppet valve. Each of the first and second poppet valves is spring biased to the open position and also pressure biased to an open position. The first poppet valve being pressure biased in response to pressurized fluid on the side thereof adjacent the steering valve and the second poppet valve being pressure biased in response to pressurized fluid in the other end of the first cylinder arrangement. The first and second poppet valves are movable to a closed, flow blocking position in response to receipt of pressurized fluid from the source of pressurized pilot fluid.

The present invention provides a steering control arrangement which insures that various modes of steering can be achieved through an integral hydraulic system incorporating the use of opposed back to back pilot operated poppet valves. By using back to back poppet valves, the leakage of hydraulic fluid within the system is substantially overcome, thus offsetting the problem of the front and rear wheels becoming out of synchronization during operation.

BRIEF DESCRIPTION OF THE DRAWINGS

The drawing is a schematic representation of a steering control system incorporating an embodiment of the present invention.

BEST MODE FOR CARRYING OUT THE INVENTION

Referring to the drawing, a hydraulic system 10 is illustrated for use on a machine (not shown) having a front pair of steerable wheels 12 interconnected by a first cylinder arrangement 14 and a rear pair of steerable wheels 16 interconnected by a second cylinder arrangement 18. The hydraulic system 10 includes a source of pressurized fluid 20 that receives fluid from a reservoir 22, a steering control arrangement 24 and an implement system 26. In the subject arrangement, the first and second cylinder arrangements 14, 18 are illustrated as being a single cylinder having a rod extending from each end thereof. However, it is recognized that each of the first and second fluid cylinder arrangements 14, 18 could be two separate cylinders with their respective chambers interconnected such that they would function identically to the single double acting cylinder illustrated. Likewise each of the first and second cylinder arrangements could be a fluid motor.

The source of pressurized fluid 20, of the subject arrangement, delivers fluid to a priority valve 28, which in a well known manner, delivers fluid on a priority basis to the steering control system 24 prior to delivering any fluid to the implement system 26. It is well known that if a priority valve 28 is not used, the flow could be delivered directly form source of pressurized fluid 20 or a flow divider or other types of valves could be utilized to provide fluid flow to both the steering control system 24 and the implement system 26.

The steering control system 24 includes the first and second fluid cylinder arrangements 14, 18 and a steering control mechanism 30. The steering control mechanism 30 is operative to select a plurality of steering modes including a first mode in which the front pair of wheels 12 are steerable, a second mode in which the front and rear pairs of wheels 12, 16 are steered simultaneously with the rear pair of wheels 16 steered in a direction opposite to the steering direction of the front pair of wheels 12 and a third mode in which the rear pair of wheels 16 are steered independently of the front pair of wheels 12. A steering valve 32 is disposed between the source of pressurized fluid 20 downstream of the priority valve 28 and the first and second cylinder arrangements 14, 18. The steering valve 32, as illustrated herein, is a hand metering unit (HMU) 34 having first and second outlet ports 36, 38 and is connected to the source of pressurized fluid 20 through an inlet port 40. The first outlet port 36 of the HMU is connected directly to one end 42 of the first cylinder arrangement 14 by a conduit 44. The second outlet port 38 is connected to another end 46 of the first cylinder arrangement 14 by a conduit 48.

A first poppet valve arrangement 50 is disposed in the conduit 48 between the second outlet port 38 of the HMU and the other end 46 of the first cylinder arrangement 14. The first poppet valve arrangement 50 includes a first normally open poppet valve 52 and a second normally open poppet valve 54. Each of the first and second normally open poppet valves 52, 54 are spring biased to an open, fluid communicating position by respective springs 56. Furthermore, each of the first and second normally open poppet valves 52, 54 are pressure biased to the open position. The first normally open poppet valve 52 is pressure biased to its open position in response to pressurized fluid in the conduit 48 on the side thereof adjacent to the second outlet port 38 of the hand metering unit 34 through a pilot conduit 58. The second normally open poppet valve 54 is pressure biased to the open position in response to the pressurized fluid in the other end 46 of the first cylinder arrangement 14 through a pilot line 60.

One end 62 of the second cylinder arrangement 18 is connected to the second outlet port 38 of the HMU 34 through a conduit 64 and a portion of the conduit 48. Another end 66 of the second cylinder arrangement 18 is connected to the other end 46 of the first cylinder arrangement 14 through a conduit 68 and another portion of the conduit 48. A second poppet valve arrangement 70 is disposed in the conduit 64 between the one end 62 of the second cylinder arrangement 18 and the second outlet port 38 of the HMU 34. The second poppet valve arrangement 70 includes a first normally closed poppet valve 72 and a second normally closed poppet valve 74. Each of the first and second normally closed poppet valves 72, 74 is spring biased to a closed position by respective springs 76. Each of the first and second normally closed poppet valves 72, 74 are also pressure biased to the closed position. The first normally closed poppet valve 72 is pressure biased to its second position by pressurized fluid in the conduit 64 on the end thereof adjacent the second outlet port 38 of the HMU 34 through a pilot line 78. The second normally closed poppet valve 74 is pressure biased to the closed position in response to pressurized fluid in the one end of the second cylinder arrangement 18 through a pilot line 80. The third poppet valve arrangement 82 is disposed in the conduit 68 between the other end 66 of the second cylinder arrangement 18 and the other end 46 of the first cylinder arrangement 14. The third poppet valve arrangement 82 includes a first normally closed poppet valve 84 and a second normally closed poppet valve 86. Each of the first and second normally closed poppet valves 84, 86 are spring biased to the closed position by respective springs 88. Each of the first and second normally closed poppet valves 84, 86 are also pressure biased to the closed position. The first normally closed poppet valve 84 is pressure biased to the closed position by pressurized fluid in the other end of the first cylinder arrangement 14 through a pilot line 90. The second normally closed poppet valve 86 is biased to the closed position in response to pressurized fluid in the other end 66 of the second cylinder arrangement 18 through a pilot line 92.

The steering control arrangement 24 also includes a rear steer valve mechanism 94 that is disposed between the source of pressurized fluid 20 downstream of the priority valve 28 and the second cylinder arrangement 18. The rear steer valve mechanism 94 includes first and second two position three way valves 96, 98 each respectively connected to the source of pressurized fluid by a conduit 100. In the subject arrangement, the first and second two position three way valves 96, 98 are electrically actuated. It is recognized that various other valves could be utilized in place of the ones illustrated without departing from the essence of the invention.

The first two position three way valve 96 is connected to the one end 62 of the second cylinder arrangement 18 by a conduit 102 and a portion of the conduit 64 and the second two position three way valve 98 is connected to the other end 66 of the second cylinder arrangement 18 by a conduit 104 and a portion of the conduit 68. The conduit 102 is connected to the conduit 64 at a location between the one end 62 of the second cylinder arrangement 18 and the second normally closed poppet valve 74 of the second poppet valve arrangement 70 while the conduit 104 is connected to the conduit 68 at a location between the other end 66 of the second cylinder arrangement 18 and the second normally closed poppet valve 86 of the third poppet valve arrangement 82.

A lock valve 110 is disposed in the conduits 102, 104 between both ends of the second cylinder arrangement 18 and the rear steer valve mechanism 94. The lock valve 110 includes first and second pilot operated, spring biased check valves 112, 114, and in a well known manner, blocks the fluid flow in the respective conduits 102, 104 from the ends of the second cylinder arrangement 18 to the rear steer valve mechanism 94 when the rear steer valve mechanism 94 is not being operated.

In a well known manner, a logic system 116 is illustrated and operational to sense the highest operating pressure in the hydraulic system 10 and directs the highest signal to the source of pressurized fluid 20 to control the flow therefrom.

A pilot control arrangement 120 is provided and operative to control opening and closing of the first, second and third poppet valve arrangements 50, 70, 82. The pilot control arrangement 120 includes a source of pressurized pilot fluid 122. In the subject arrangement, the source of pressurized pilot fluid is provided by the source of pressurized fluid 20 being directed through a conduit 124. It is recognized that the source of pressurized pilot fluid 122 could be coming from another source, such as a separate pilot pump (not shown). The pilot control arrangement 120 also includes a pilot control valve mechanism 126 disposed between the source of pressurized pilot fluid 122 and the first, second and third poppet valve arrangements 50, 70, 82. A pilot conduit network 128 connects the pilot control valve mechanism 126 to the respective ones of the first, second and third poppet valve arrangements 50, 70, 82. A conduit 130 connects the pilot control valve mechanism 126 to the reservoir 22. In the subject arrangement, pilot pressure in the pilot conduit network 128 is effective to move the first, second and third poppet valve arrangements 50, 70, 82 to their respective second positions against the opposed forces of the respective springs and the pressure forces acting thereon.

A spring biased one way check valve 132 is disposed in the conduit 130 between the pilot control valve mechanism 126 and the reservoir 22 and operative to pass flow from the pilot control valve mechanism 126 to the reservoir 22 and block reverse flow therethrough. Likewise, a one way check valve 134 is disposed in the conduit 124 between the pilot control valve mechanism 126 and the source of pressurized pilot fluid 122 and operative to pass fluid flow from the source of pressurized fluid to the pilot control valve mechanism 126 and block reverse flow therethrough.

An accumulator 138 is connected to the conduit 124 between the pilot control valve mechanism 126 and the one way check valve 134.

A second accumulator 140 is connected to the conduit 64 between the one end 62 of the second cylinder arrangement 18 and the second poppet valve arrangement 70 and a third accumulator 142 is connected to the conduit 68 between the other end of the second cylinder arrangement 18 and the third poppet valve arrangement 82.

It is recognized that various forms of the steering control arrangement 24 illustrated herein could be utilized without departing from the essence of the invention. For example, the area relationships between the pilot piston and the poppet in the respective first, second and third poppet valve arrangements 50, 70, 82 could be varied to meet the specific requirements of a given system, even though the ones shown herein are generally illustrated as having a four to one area relationship. The four to one area relationship requires that the pressures within the respective conduits 48, 64, 68 would have to be at least four times higher than the pressurized fluid in the pilot conduit network 128 in order to cause the respective poppet valves to move from their actuated position once pressurized fluid is directed into the pilot conduit network 128. Furthermore, the spring bias forces on the one way check valves 132, 134 could be varied according to system requirements.

INDUSTRIAL APPLICABILITY

In the operation of the steering control arrangement 24 illustrated herein, the operator makes an input to the steer control mechanism 30. In order to have front wheel steer only, the operator makes an input to the HMU 34 thus directing pressurized fluid from the first outlet port 36 to the one end 42 of the first cylinder arrangement 14. The exhaust fluid passes from the other end 46 thereof through the conduit 48 and the first poppet valve arrangement 50 to the second outlet port 38 of the HMU 34 and subsequently to the reservoir 22. The fluid in the conduit 48 cannot pass through the respective second and third poppet valve arrangements 70, 82 since the first normally closed poppet valves 72, 84 of the respective second and third poppet valve arrangements 70, 82 are in their spring biased closed position and being further biased to their respective closed positions by the pressurized fluid in the respective conduits 64, 68 acting through the pilot lines 78, 90. Likewise, an operator's input to the HMU 34 in the opposite direction results in the pressurized fluid being directed through the conduit 48 to the other end 46 of the first cylinder arrangement 14 moving it in the opposite direction to steer the front pair of steerable wheels 12 in the opposite direction. During this mode of operation, the first and second normally open poppet valves 52, 54 are spring biased to their open position by the respective springs 56 and further biased to their open position by the pressurized fluid in the conduit 48 being directed through the respective pilot lines 58, 60.

In order to provide coordinated or circle steering in which the front pair of wheels 12 are steered in one direction and the rear pair of wheels 16 are steered in the opposite direction, the operator makes an input to shift the pilot control valve mechanism 126 to its second position. In the second position, pressurized fluid is directed through the pilot conduit network 128 to the respective first, second and third poppet valve arrangements 50, 70, 82. The pressurized pilot fluid in the pilot conduit network 128 moves the first and second normally open poppet valves 52, 54 of the first poppet valve arrangement 50 to their second position blocking fluid flow therethrough. Simultaneously therewith, pressurized fluid in the pilot conduit network 128 moves each of the first and second normally closed poppet valves 72, 74, 84, 86 of the respective second and third poppet valve arrangements 70, 82 to their second open position.

In the second flow blocking position of the first and second normally open poppet valves 52, 54, the first normally open poppet valve 52 blocks flow from the other end 46 of the first cylinder arrangement 14 toward the second outlet port 38 of the HMU 34 and the second normally open poppet valve 54 blocks fluid flow from the second outlet port 38 to the other end 46 of the first cylinder arrangement 14. The use of the opposed first and second normally open poppet valves 52, 54 insures that there is no communication thereacross when the first and second normally open poppet valves 52, 54 are in their second flow blocking positions.

A subsequent input to the HMU 34 directs pressurized fluid from the first outlet conduit 36 to the one end 42 of the first cylinder arrangement 14 to steer the front pair of wheels 12 in one direction. The exhaust flow therefrom passes through the other end 46 thereof, to the conduit 48, the conduit 68 and across the second poppet valve arrangement 70 and into the other end 66 of the second cylinder arrangement 18. This forces the second cylinder arrangement 18 to steer the rear pair of wheels 16 in a direction opposite to the front pair of wheels 12. The exhaust flow therefrom passes through the one end 62 of the second cylinder arrangement 18, the conduit 64 across the third poppet valve arrangement 82, the conduit 48 to the second outlet port 38 of the HMU 34 and therethrough to the reservoir 22.

When it is desired to provide coordinated or circle steer in the opposite direction, the operator provides an opposite input to the HMU 34. The fluid flows from the outlet port 38 of the HMU 34 through the conduit 48, the conduit 64 across the second poppet valve arrangement 70 to the one end 62 of the second cylinder arrangement 18 to steer the rear pair of wheels 16 in the opposite direction. The exhaust flow therefrom passes through the conduit 68 across the third poppet valve arrangement 82, the conduit 48 to the other end 46 of the first cylinder arrangement 14 to steer the front pair of wheels 12 in a direction opposite to the rear pair of wheels 16. The exhaust flow therefrom passes through the conduit 44, across the HMU 34 to the reservoir 22.

When it is desired to operate the rear pair of wheels 16 independently of the front pair of wheels 12, the pilot control valve mechanism 126 is moved to a position to vent the fluid pressure in the pilot conduit network 128 to the reservoir 22 through the conduit 130 across the spring biased one way check valve 132. Since the pilot conduit network 128 is vented to the reservoir 22, the second and third pilot valve arrangements 70, 82 return to their first, flow blocking positions. Since the respective second normally closed pilot valves 74, 86 of the respective second and third poppet valve arrangement 70, 82 are pressure biased to their closed position by pressurized fluid in the respective ends of the second cylinder arrangement 18 through the respective pilot conduits 80, 92, any adverse pressure fluctuations in the respective ends of the second cylinder arrangement 18, the respective second normally closed poppet valves 74, 86 are held closed. Likewise, the respective first normally closed poppet valves 72, 84 of the respective second and third poppet valve arrangements 70, 82 are held closed by pressurized fluid in the conduits 48, 64, 68 through their respective pilot conduits 78, 90.

In this mode of operation, the operator moves the first solenoid operated valve 96 to its second position directing pressurized fluid through the conduit 102 and the one side of the lock valve 110 to the one end 62 of the second cylinder arrangement 18 to steer the rear pair of wheels 16 in one direction. The exhaust flow therefrom passes through the other end 66 thereof through the conduit 68 to the conduit 104. Since, in a conventional manner, the pressurized fluid in the conduit 102 is directed to the other side of the lock valve 110 to open the check valve in the conduit 104, the exhaust flow therein passes therethrough and subsequently passes to the reservoir 22 through the second solenoid actuated valve 98.

Likewise, when it is desired to steer the rear pair of wheels 16 in the opposite direction, the first solenoid actuated valve 96 remains unactuated and the second solenoid actuated 98 is selectably actuated by the operator to direct pressurized fluid through the other side of the lock valve 110 and the conduit 104 to the other end 66 of the second cylinder arrangement 18, thus steering the rear pair of wheels 16 in the opposite direction. The exhaust flow therefrom passes through the conduit 64, the conduit 102 and through the one side of the lock valve 110 across the first solenoid operated valve 96 to the reservoir 22.

In some systems, it may be advantageous to utilize the first accumulator 138 connected to the source of pressurized fluid 122 upstream of a one way check valve 34 to insure that an initial volume of pressurized fluid is available instantaneously when the pilot control valve mechanism 126 is actuated. The use of the first accumulator 138 further insures that, during operation, in the event of a sudden decrease in the source of pressurized pilot fluid 122, the accumulator 138 would supplement the pressurized fluid in the pilot conduit network 128 to insure that the respective first, second and third poppet valve arrangements 50, 70, 82 are firmly held in their respective positions.

Likewise, the second and third accumulators 140, 142 respectively connected to the respective conduits 64, 68 may be beneficial to reduce end of travel shock that at times results when a fluid cylinder reaches the end of its travel. Furthermore, the respective second and third accumulators 140, 142 can provide makeup fluid in the circuit as the fluid is cooling down or can provide a chamber for expansion in situations in which trapped, uncirculated fluid is expanding due to increased temperatures.

Other aspects, objects and advantages of the invention can be obtained from a study of the drawings, the disclosure and the appended claims.

I claim:

1. A steering control arrangement for use in a machine having a first cylinder arrangement connected between a front pair of steerable wheels, a second cylinder arrangement connected between a rear pair of steerable wheels, a reservoir, a steering control arrangement having a steering valve directly connected to one end of the first cylinder arrangement and being operatively associated with both the first and second cylinder arrangements, a source of pressurized fluid, a first steering mode for steering only the front pair of steerable wheels, a second steering mode for simultaneously steering the front and rear pair of steerable wheels, a third steering mode for steering the rear pair of steerable wheels independent of the front pair of steerable wheels, a rear steer valve mechanism fluidly connected between the source of pressurized fluid and opposite ends of the second cylinder arrangement, a first poppet valve arrangement fluidly connected between the steering valve and one end of the first cylinder arrangement, a second poppet valve arrangement fluidly connected between the steering valve and the connection between the first valve mechanism and the one end of the second cylinder arrangement, a third poppet valve arrangement fluidly connected between the other end of the second cylinder arrangement and the other end of the first cylinder arrangement, and a pilot control arrangement having a source of pressurized pilot fluid and operative to control opening and closing of the first, second and third poppet valve arrangements, the steering control arrangement comprising:

the first poppet valve arrangement having a first normally open poppet valve and a second normally open poppet valve, each of the first and second poppet valves being spring biased to the open position and also pressure biased to an open position, the first poppet valve being pressure biased in response to pressurized fluid on the side thereof adjacent the steering valve and the second poppet valve being pressure biased in response to pressurized fluid in the other end of the first cylinder arrangement, and the first and second poppet valves being selectively movable to a closed, flow blocking position in response to receipt of pressurized fluid from the source of pressurized pilot fluid.

2. The steering control arrangement of claim 1 wherein the second and third poppet valve arrangements each has first and second normally closed poppet valves, each of the normally closed poppet valves being spring biased to the closed position and also pressure biased to the closed position, the first normally closed poppet valve of the second poppet valve arrangement is pressure biased to the closed position in response to pressurized fluid on the side thereof adjacent the steering valve and the second normally closed poppet valve thereof is pressure biased to the closed position in response to pressurized fluid in the one end of the second cylinder arrangement, the first normally closed poppet valve of the third poppet valve arrangement being pressure biased to the closed position in response to pressurized fluid in the other end of the first cylinder arrangement and the second normally closed poppet valve thereof being pressure biased to the closed position in response to pressurized fluid in the other end of the second cylinder arrangement, and each of the normally closed poppet valves being selectively movable to an open position in response to receipt of pressurized fluid from the source of pressurized pilot fluid.

3. The steering control arrangement of claim 2 wherein in the closed, flow blocking position, the first normally closed poppet valve of the second poppet valve arrangement blocks fluid flow from the steering valve to the one end of the second cylinder arrangement and the second normally closed poppet valve thereof blocks fluid flow from the one end of the second cylinder arrangement to the steering valve, and in the closed, flow blocking position, the first normally closed poppet valve of the third poppet valve arrangement blocks fluid flow from the other end of the first cylinder arrangement to the other end of the second cylinder arrangement and the second normally closed poppet valve thereof blocks fluid flow from the other end of the second cylinder arrangement to the other end of the first cylinder arrangement.

4. The steering control arrangement of claim 3 wherein in the closed, flow blocking position, the first poppet valve of the first poppet valve arrangement blocks flow from the side thereof adjacent the steering valve to the other end of the first cylinder arrangement and the second poppet valve thereof blocks flow from the other end thereof to the side thereof adjacent the steering valve.

5. The control arrangement of claim 4 wherein the pilot control arrangement includes a pilot control valve mechanism disposed between the source of pressurized pilot fluid, the first, second, and third poppet valve arrangements and the reservoir and operative to selectively direct pressurized pilot fluid to the first, second and third poppet valve arrangements or to connect the first, second and third poppet valve arrangements with the reservoir.

6. The control arrangement of claim 5 wherein the pilot control arrangement includes a spring biased one way check valve disposed between the pilot control valve mechanism and the reservoir and operative to pass flow from the pilot control valve mechanism to the reservoir and to block reverse flow therethrough.

7. The control arrangement of claim 6 including a lock valve disposed between both ends of the second cylinder arrangement and the first valve mechanism, the lock valve arrangement having first and second pilot operated, spring biased check valves.

8. The control arrangement of claim 7 wherein the pilot control arrangement includes a one way check valve disposed between the source of pressurized pilot fluid and the pilot control valve mechanism and operative to allow flow from the source of pressurized pilot fluid to the pilot control valve mechanism and an accumulator connected between the one way check valve and the pilot control valve mechanism.

9. The control arrangement of claim 8 including a second accumulator connected between the one end of the second cylinder arrangement and the second poppet valve arrangement and a third accumulator connected between the other end of the second cylinder arrangement and the third poppet valve arrangement.

* * * * *